(12) United States Patent
Cai

(10) Patent No.: US 10,394,087 B2
(45) Date of Patent: Aug. 27, 2019

(54) DISPLAY PANEL AND MANUFACTURING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Peizhi Cai, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 840 days.

(21) Appl. No.: 14/387,590

(22) PCT Filed: Jun. 28, 2013

(86) PCT No.: PCT/CN2013/078455
§ 371 (c)(1),
(2) Date: Sep. 24, 2014

(87) PCT Pub. No.: WO2014/173009
PCT Pub. Date: Oct. 30, 2014

(65) Prior Publication Data
US 2015/0316807 A1    Nov. 5, 2015

(30) Foreign Application Priority Data
Apr. 27, 2013    (CN) .......................... 2013 1 0153807

(51) Int. Cl.
*G02F 1/1339*    (2006.01)

(52) U.S. Cl.
CPC .................. *G02F 1/13394* (2013.01); *G02F 2001/13398* (2013.01); *Y10T 428/10* (2015.01); *Y10T 428/1036* (2015.01); *Y10T 428/1077* (2015.01)

(58) Field of Classification Search
CPC ....... G02F 1/13394; G02F 2001/13398; Y10T 428/10; Y10T 428/1036; Y10T 428/1077
See application file for complete search history.

(56) References Cited

U.S. PATENT DOCUMENTS 7,557,891 B2 * 7/2009 Yoon .................. G02F 1/13394
349/141
2005/0106768 A1 * 5/2005 Onozuka ............... H01L 27/146
438/30

(Continued)

FOREIGN PATENT DOCUMENTS

CN        1499299 A     5/2004
CN        1693977 A    11/2005

(Continued)

OTHER PUBLICATIONS

International Search Report, International Preliminary Report on Patentability and Written Opinion of the International Searching Authority of PCT/CN2013/078455 in Chinese, dated Feb. 20, 2014.

(Continued)

*Primary Examiner* — Anthony J Frost
(74) *Attorney, Agent, or Firm* — Collard & Roe, P.C.

(57) ABSTRACT

A display panel comprises: a first substrate (1); a second substrate (3), provided opposite to the first substrate (1); and an adsorption spacer (2), provided between the first substrate (1) and the second substrate (3), wherein, the adsorption spacer (2) is provided with an adsorption portion, the first (Continued)

substrate (1) and the second substrate (3) are cell-assembled together through a vacuum adsorption effect of the adsorption spacer (2).

17 Claims, 3 Drawing Sheets

(56) References Cited

U.S. PATENT DOCUMENTS

| | | | | |
|---|---|---|---|---|
| 2007/0259589 A1* | 11/2007 | Izumi | ............... | G02F 1/1303 445/66 |
| 2008/0151133 A1* | 6/2008 | Kim | ............... | G02F 1/13338 349/12 |
| 2009/0079928 A1* | 3/2009 | Ohashi | ............... | G02F 1/13394 349/156 |
| 2013/0070182 A1* | 3/2013 | Lee | ............... | H01J 9/24 349/62 |

FOREIGN PATENT DOCUMENTS

| | | |
|---|---|---|
| JP | 2000007146 A | 1/2000 |
| JP | 2004191841 A | 7/2004 |
| TW | 200521519 A | 7/2005 |

OTHER PUBLICATIONS

Chinese Office Action in Chinese Application No. 201310153807.4 dated May 25, 2016 with English translation.

Second Chinese Office Action in Chinese Application No. 201310153807.4 dated Feb. 8, 2017 with English translation.

English translation of the International Preliminary Report on Patentability and Written Opinion of the International Searching Authority of PCT/CN2013/078455, dated Oct. 27, 2015.

* cited by examiner (a)

(b)

US 10,394,087 B2

DISPLAY PANEL AND MANUFACTURING METHOD THEREOF

CROSS REFERENCE TO RELATED APPLICATIONS

This application is the National Stage of PCT/CN2013/078455 filed on Jun. 28, 2013, which claims priority under 35 U.S.C. § 119 of Chinese Application No. 201310153807.4 filed on Apr. 27, 2013, the disclosure of which is incorporated by reference.

TECHNICAL FIELD

Embodiments of the present invention relate to a display panel and a manufacturing method thereof.

BACKGROUND

In an existing manufacturing process of a thin film transistor-liquid crystal display (TFT-LCD), a sealant is usually coated at the periphery of a color filter substrate and/or an array substrate so as to adhere the color filter substrate and the array substrate, thus a display panel is formed. Here, the sealant functions for adhesion, as well as supporting a cell gap at the periphery of the display panel. However, in practice, for consideration of the ultraviolet (UV) light transmittance during curing the sealant by UV light, it is required that a certain space has to be left for wiring of the display panel at the peripheral, but the sealant itself is relatively wide and unable to be narrowed, resulting in that the prior art can not fabricate a display panel with an ultra-narrow frame.

Moreover, with regard to the existing sealant process, the sealant is easy to be fractured and aggregated during a sealant-coating process, resulting in bubbles in the display panel, as well as the uneven gap at the periphery of the display panel, causing the display panel whitish and other defects. In addition, during cell-assembling and sealant-curing processes, due to non-completely cured sealant, it will lead to pollution to liquid crystal and alignment deviation of a color filter substrate and an array substrate while using a robotic arm to pick and place the two substrates, thus easily leading to the abnormal display and light leakage and other defects.

SUMMARY

Embodiments of the present invention provide a display panel and a manufacturing method thereof, which can reduce production cost, improve production efficiency and product quality.

An embodiment of the present invention provides a display panel, comprising: a first substrate; a second substrate, provided opposite to the first substrate; and an adsorption spacer, provided between the first substrate and the second substrate, wherein, the adsorption spacer is provided with an adsorption portion, the first substrate and the second substrate are cell-assembled together through a vacuum adsorption effect of the adsorption spacer.

An embodiment of the present invention further provides a manufacturing method of a display panel, and the method comprises: forming an adsorption spacer on a first substrate, wherein the adsorption spacer is provided with an adsorption portion; cell-assembling the first substrate and a second substrate to form a display panel, in which, the first substrate and the second substrate are cell-assembled together through a vacuum adsorption effect of the adsorption spacer.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 4:
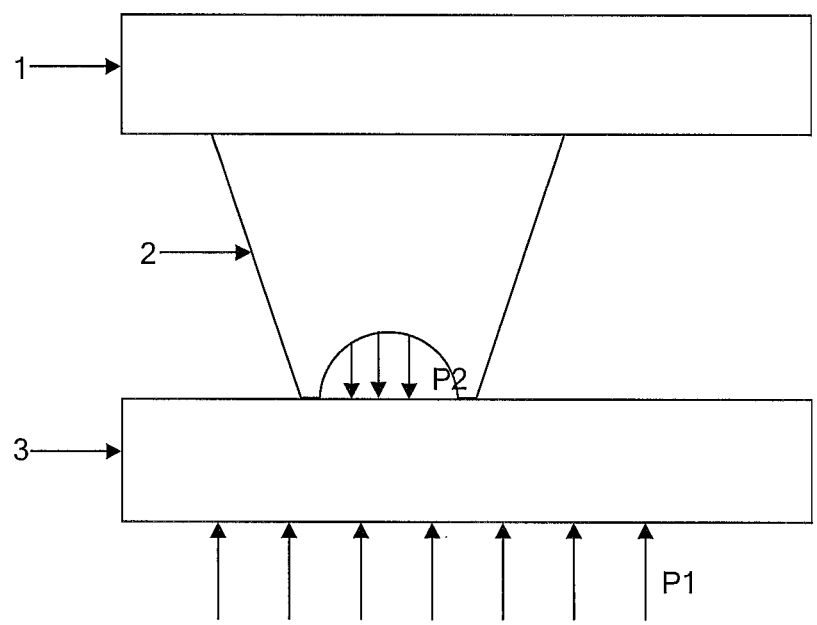
FIG. 4 is a view illustrating the vacuum adsorption principle of an adsorption spacer in the display panel, according to an embodiment of the present invention.

FIG. 4 shows a cross-sectional structural view of a display panel according to an embodiment of the present invention. As shown in FIG. 4, the display panel according to the embodiment of the present invention comprises: a first substrate 1; a second substrate 3, provided opposite to the first substrate 1; and an adsorption spacer 2, provided between the first substrate 1 and the second substrate 3, wherein, an adsorption portion is provided to the adsorption spacer 2, moreover, the first substrate 1 and the second substrate 3 are cell-assembled together through the vacuum adsorption effect of the adsorption spacer, in which the shown adsorption spacer is an exemplary structure.

Below, with reference to FIGS. 1-3, a structure of the adsorption spacer in accordance with the embodiment of the present invention will be described in detail.

Figure 1:
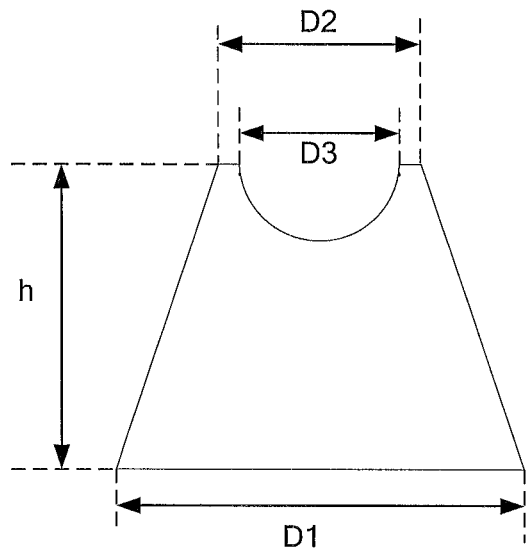
FIG. 1(a) is a structural view of an adsorption spacer according to an embodiment of the present invention.
FIG. 1(b) is a plan view of the adsorption spacer according to the embodiment of the present invention.
Figure 1:
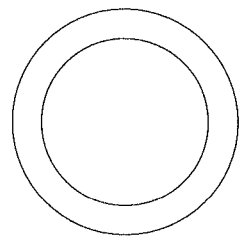
Figure 2:
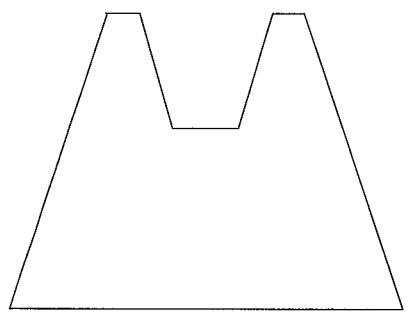
FIG. 2 is a structural view of another adsorption spacer according to an embodiment of the present invention.

FIG. 1 shows a structural view of an adsorption spacer in accordance with an embodiment of the present invention, in which, FIG. 1(a) is a cross-sectional view of the adsorption spacer, and FIG. 1(b) is a plan view of the adsorption spacer. As shown in FIG. 1, the adsorption portion is a groove provided at the top of the adsorption spacer.

Alternatively, the adsorption spacer has at least one groove at the top thereof, that is, the adsorption spacer may have one, two or more grooves at the top thereof, which is chosen according to actual needs.

Alternatively, the groove provided at the top of the adsorption spacer may has a cross-sectional shape of trapezoidal, arc-shaped, conical, etc, as long as the groove is formed to have a cross-sectional shape that tapers from an opening (i.e. the top) of the groove to a bottom of the groove. Exemplarily, FIG. 1(a) shows the adsorption spacer with a groove having an arc-shaped cross-sectional shape, and FIG. 2 shows the adsorption spacer with a groove having a trapezoidal cross-sectional shape.

Alternatively, the adsorption spacer is provided at the periphery of the display panel.

Alternatively, the display panel according to the embodiment of the present invention further comprises a support spacer formed inside the display panel. Here, it should be noted that, the support spacer is used to support a cell gap (i.e., a thickness of a liquid crystal layer), therefore, the support spacer inside the display panel according to the embodiment of the present invention may be similar to the adsorption spacer in structure, that is, the support spacer is also provided with a groove at the top thereof, and also may be a commonly-used spacer in the prior art. The support spacer may have a same size as the adsorption spacer, and also may have different size from the adsorption spacer, which can be designed according to requirement.

Further, the adsorption spacer formed at the periphery of the display panel is different in size from the support spacer formed inside the display panel. Here, with reference to FIG. 1, a dimension of the spacer will be described. As shown in FIG. 1, the dimension of the spacer comprises: a bottom width D1, a top width D2 and a height h of the spacer, as well as a top width D3 of a groove provided to the spacer (if the spacer is provided with the groove at the top thereof).

By way of example, in the embodiment of the present invention, the adsorption spacer has the bottom width D1 of 0.3-0.5 mm, the top width D2 of 0.25-0.45 mm, and the height h of the adsorption spacer is the same as the height h of the support spacer. Further, if the adsorption spacer has one groove at the top thereof, then the groove has the top width D3 of 0.2-0.4 mm. Here, it should be noted that, the top width of the groove refers to a maximum length of the groove which is contacted with a substrate during cell-assembling, in the case that the adsorption spacer has only one groove at the top thereof.

Further, the adsorption spacer adopts a highly-elastic resin material. Since the adsorption spacer adopts the highly-elastic resin material, during a cell-assembling process, a vacuum adsorption effect can be better achieved, so that the first substrate and the second substrate are firmly bonded. Alternatively, the highly-elastic resin material is polyurethane (PU) or ethylene-vinyl acetate copolymer (EVA).

It should be noted that, FIG. 1(a) and FIG. 1(b) only illustrate the case of the adsorption spacer with one groove at the top thereof, and such a structure is merely one optional scheme of the embodiments of the present invention, and is not limitative of the structure of the adsorption spacer in the display panel in accordance with the embodiment of the present invention. In practical application, the groove at the top of the adsorption spacer formed in the display panel, also may has a cross-sectional shape as shown in FIG. 2; moreover, the groove at the top of the adsorption spacer formed in the display panel may be plural in number, and the grooves may have different sizes, as long as the grooves can make the first substrate and the second substrate firmly bonded through the vacuum adsorption.

Here, in the embodiment of the present invention, the support spacer formed inside the display panel has a bottom width and a top width that are substantially same as a bottom width and a top width of a commonly-used support spacer in the prior art, that is, the support spacer formed inside the display panel has the bottom width of about 20 μm and the top width of about 15 μm. Moreover, in the case that the support spacer is similar to the adsorption spacer in structure, that is, in the case that it is provided with a groove at the top thereof, the groove at the top of the support spacer has a top width of about 10 μm (here, the top width of the groove refers to a maximum length of the groove which is contacted with a substrate during cell-assembling, when the support spacer has only one groove at the top thereof).

In addition, in the display panel according to an embodiment of the present invention, since the adsorption spacer in the display panel is provided with a groove at the top thereof, and the adsorption spacer is formed of highly-elastic resin, therefore, in a case where the adsorption spacer is used for cell-assembling of a color-filter substrate and an array substrate, a height h of the adsorption spacer between the cell-assembled color-filter substrate and array substrate is reduced comparing to that before cell-assembling, this is because, as a result of a vacuum adsorption effect during cell-assembling, a portion of the height is compressively adsorbed on the first substrate, while the other portion of the height of the adsorption spacer is used to support the cell gap. Thus, in the embodiment of the present invention, the adsorption spacer formed in the display panel has a height slightly higher than a height of a spacer in the prior art; moreover, a portion of the height of the adsorption spacer to be compressively adsorbed on the first substrate occupies about 30% of an entire height of the adsorption spacer, that is, the height of the adsorption spacer after cell-assembling is about 70% of the height of the adsorption spacer prior to the cell-assembling. By way of example, if the height of the adsorption spacer prior to cell-assembling is 5 μm, then the portion of the height to be compressively adsorbed on the first substrate is 1.5 μm, while the height for supporting the cell gap is 3.5 μm. It should be noted that, the bottom width and top width of the adsorption spacer formed in the display panel and the top width of the groove at the top of the adsorption spacer may be adjusted according to actual requirement, for example, the bottom width and top width of the adsorption spacer formed in the display panel and the top width of the groove at the top of the adsorption spacer may be adjusted according to the size of the display panel, etc.

It should be noted that, when the support spacer formed inside the display panel is similar in structure to the adsorption spacer formed at the periphery of the display panel, the support spacer may also be called as an adsorption spacer; in this case, the adsorption spacer formed in the display panel comprises: the adsorption spacer formed at the periphery of the display panel, and the adsorption spacer formed inside the display panel; when the support spacer formed inside the display panel is a commonly-used spacer in the prior art, then the adsorption spacer formed in the display panel only refers to the adsorption spacer formed at the periphery of the display panel.

Figure 3:
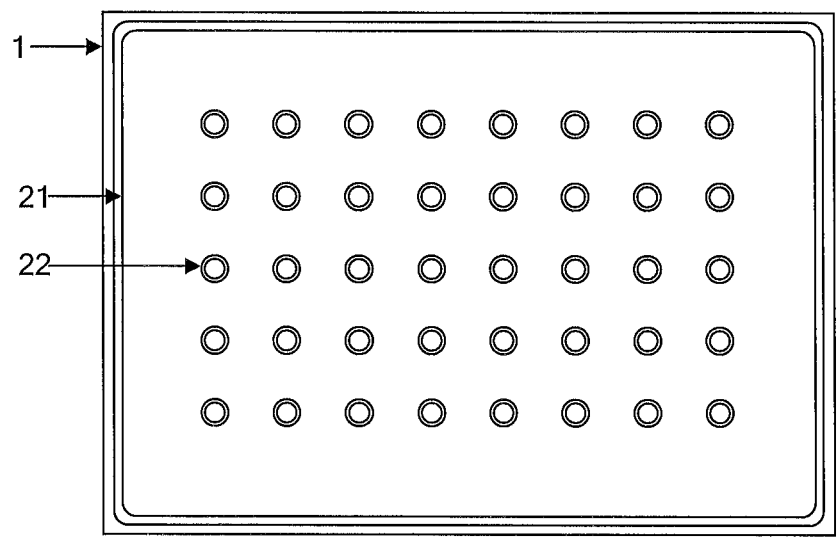
FIG. 3 is a schematic distribution view of an adsorption spacer according to an embodiment of the present invention, after completion fabrication on a first substrate.

FIG. 3 is a schematic distribution view of the adsorption spacer after completion fabrication on the first substrate; by way of example, in FIG. 3, both the support spacer formed inside the display panel and the adsorption spacer formed at the periphery of the display panel have their structures as shown in FIG. 1(a). Since the display panel comprises the first substrate, so, the schematic distribution view of the adsorption spacer after completion of fabrication on the first substrate is the same as the distribution profile of the adsorption spacer in the display panel. It should be noted that, the display panel comprises the first substrate and the second substrate, so, forming a plurality of adsorption spacers in the display panel may be further explained as follows: a plurality of adsorption spacers are formed at the periphery of the first substrate, and the adsorption spacers are closely arranged so as to substitute the sealant in the prior art. Because a groove is provided at the top of the adsorption spacer in the display panel according to the embodiment of the present invention, the first substrate and the second substrate may be firmly bonded together, through the vacuum adsorption effect of the groove at the top of the adsorption spacer formed at the periphery of the display panel (indicated by reference numeral 21 as shown in FIG. 3), therefore, without the need of coating the sealant for adhesive-bonding, the first substrate and the second substrate can also be bonded firmly and evenly; also, because the support spacer formed inside the display panel has a groove at the top thereof (indicated by reference numeral 22 as shown in FIG. 3), therefore, it can further enhance the adsorption force between the first substrate and the second substrate.

FIG. 4 is a view illustrating the vacuum adsorption principle of the adsorption spacer in the display panel, according to an embodiment of the present invention. The adsorption force $F=(P1-P2)*S$, wherein, P1 is atmospheric pressure, P2 is vacuum pressure within the groove of the adsorption spacer, S is an adsorption area. When the first substrate 1 and the second substrate 3 are cell-assembled, a vacuum pumping apparatus is used to form a vacuum in a chamber formed in the cell-assembling process of the first substrate 1 and the second substrate 3, thus the vacuum pressure $P2 \approx 0$ when the cell-assembling process is completed, pumping vacuum is stopped, and the chamber is opened to the atmosphere, that is, air enters into the chamber, thus, P1 is the atmosphere pressure, and at this moment, between the first substrate 1 and the second substrate 3, the adsorption force $F \approx P1*S$. As can be seen from the above equation, if a bad absorption occurs, then such bad absorption may be improved by increasing S (i.e., increasing an contact area of the groove at the top of the adsorption spacer and the substrate) and reducing P2 (i.e., increasing the vacuum degree during cell-assembling under the vacuum).

An embodiment of the present invention further provides a manufacturing method of the above-described display panel comprising a first substrate and a second substrate, and the method comprises steps as follows:

forming an adsorption spacer on the first substrate or the second substrate, wherein the adsorption spacer is provided with an adsorption portion at the top thereof;

cell-assembling the first substrate and the second substrate to form a display panel, wherein the first substrate and the second substrate are cell-assembled together through a vacuum adsorption effect of the adsorption spacer.

Further, the forming the adsorption spacer on the first substrate or the second substrate comprises:

coating highly-elastic resin material on the first substrate or the second substrate;

forming the adsorption spacer through a patterning process, wherein the adsorption spacer is provided with the adsorption portion at the top thereof, and the adsorption portion is a groove formed at the top of the adsorption spacer.

Further, the patterning process comprises a multi-gray-scale mask process.

Figure 5:
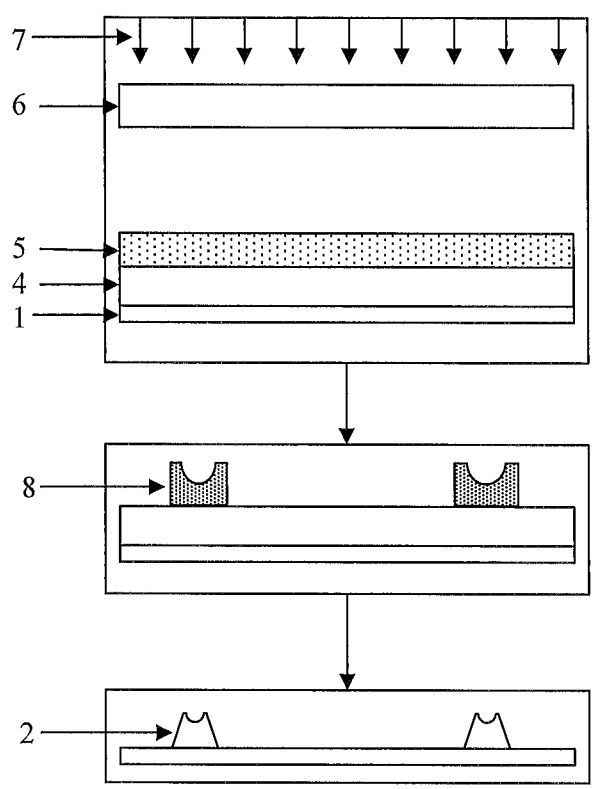
FIG. 5 is a schematic view illustrating a fabrication procedure of an adsorption spacer in the display panel, according to an embodiment of the present invention.

FIG. 5 is a schematic view illustrating a fabrication procedure of the adsorption spacer of the display panel according to an embodiment of the present invention. As shown in FIG. 5, the method for forming the adsorption spacer in the above-described display panel, comprises:

(1) uniformly coating a spacer material on the first substrate 1 to form a spacer layer 4, and after completion of curing the spacer material, coating a layer of photoresist 5 on the spacer layer 4;

(2) exposing the photoresist 5 by using a light source 7 and a multi-gray-scale mask 6 which is used for fabrication of the spacer with a groove at the top thereof and developing the photoresist 5 to form a exposed photoresist 8 after the exposure, and then etching the spacer layer 4 by using the exposed photoresist 8, and finally, forming an adsorption spacer 2 with a groove at the top thereof on the first substrate 1.

Here, it should be noted that, if the spacer material adopts a photoresist material, then steps of coating the photoresist and developing the photoresist may be omitted, and thus the above-described steps become as follows:

(1) uniformly coating a spacer material on the first substrate 1 to form a spacer layer 4;

(2) exposing the spacer layer 4 by using a light source 7 and a multi-gray-scale mask 6 which is used for fabrication a spacer with a groove at the top thereof, and then developing the spacer layer 4, thus, forming an adsorption spacer with a groove at the top thereof on the first substrate 1.

In the fabrication procedure of the display panel according to an embodiment of the present invention, it is further comprised steps for formation of a support spacer. If the support spacer is similar in structure to the adsorption spacer, then the manufacturing method for formation of the support spacer in the display panel is the same as the manufacturing method for formation of the adsorption spacer; if the support spacer has a structure of a spacer in the prior art, then the manufacturing method for formation of the support spacer in the display panel is the same as that in the prior art, of which the description is omitted.

The display panel and the manufacturing method thereof provided by the embodiments of the present invention, have the following features:

The display panel of the embodiment of the present invention is provided with an adsorption spacer, and the adsorption spacer is provided with a groove-shaped adsorption portion at the top thereof, and during cell-assembling, a first substrate and a second substrate are firmly bonded through the adsorption portion of the adsorption spacer in the display panel; therefore, without the need of coating sealant for adhesive bonding, the first substrate and the second substrate can be bonded to each other firmly and evenly;

From a perspective of cost saving, on one hand, the adsorption spacer in the display panel according to an embodiment of the present invention may be obtained through the same exposing process as a spacer in the prior art, without any cost increase; moreover, the adsorption spacer can completely substitute the sealant, thus saving cost for purchase raw materials such as the sealant, Au-ball, silicon-ball, etc.; on the other hand, because the display panel according to an embodiment of the present invention is provided with the adsorption spacer, without the use of sealant, thus omitting some related processes such as mixing, coating, testing, curing, etc., and saving fixed investment for related processing equipment, for example, without an UV-light curing process, and further without fabrication of a UV-light mask (UV Mask), which can greatly save development costs in early product development, and further can save production time occupied by related processes, thereby greatly reducing production costs and improving production efficiency;

In addition, since there is no UV curing step, so, a peripheral wiring of the display panel according to the embodiment of the present invention does not need to consider the problem of UV transmittance, etc., and therefore, the wiring at the periphery of the display panel can be arranged closely, which can greatly reduce wiring space and thus lay foundation for fabrication of a display panel with an ultra-narrow frame;

because the display panel according to an embodiment of the present invention is provided with an adsorption spacer, and the adsorption spacer can completely substitute sealant, without pollution to liquid crystal, thus completely avoiding problems due to sealant pollution, such as defective display at the periphery of the display panel, thereby improving the product quality, increasing the yield, and further reducing the cost;

because the adsorption spacer in the display panel is fabricated through a patterning process, thus without bubbles due to fracturing and aggregating of the sealant during coating the sealant, and uneven height at the periphery of the panel, etc., which further improves the product quality, the yield and reduces the cost;

After completion of vacuum cell-assembling, because an adsorption spacer is formed in the display panel according to an embodiment of the present invention, and through the vacuum adsorption effect of the adsorption portion of the adsorption spacer, a first substrate and a second substrate can be firmly bonded together, so that, during picking and placing the display panel, relative-moving of the above-mentioned two substrates will not occur, therefore, during picking and placing, a problem of relative-moving of the above-mentioned two substrates can be avoided due to non-completely cured sealant, thereby avoiding Zara Align and light leakage, and improving product yield.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A display panel, comprising:
   a first substrate;
   a second substrate, provided opposite to the first substrate; and
   an adsorption spacer, provided between the first substrate and the second substrate, wherein the adsorption spacer is provided with an adsorption portion, the first substrate and the second substrate are cell-assembled together through a vacuum adsorption effect of the adsorption spacer, the adsorption portion comprises a vacuum chamber in a case that the first substrate and the second substrate are cell-assembled together, and the adsorption spacer is configured to support a cell gap; the adsorption spacer is formed at a periphery of the display panel, and no sealant is located at the periphery of the display panel.

2. The display panel according to claim 1, wherein the adsorption portion is a groove provided at the top of the adsorption spacer.

3. The display panel according to claim 2, wherein there is at least one the groove at the top of the adsorption spacer.

4. The display panel according to claim 2, wherein the groove is formed to have a cross-sectional shape that tapers from an opening of the groove to a bottom of the groove.

5. The display panel according to claim 4, wherein the cross-sectional shape of the groove is trapezoidal, arc-shaped or conical.

6. The display panel according to claim 1, further comprises: a support spacer, formed inside the display panel, wherein the support spacer is the same as the adsorption spacer in structure, but the support spacer and the adsorption spacer are different in size.

7. The display panel according to claim 1, further comprises: a support spacer, formed inside the display panel, wherein the support spacer is different from the adsorption spacer in structure.

8. The display panel according to claim 1, wherein the adsorption spacer has a bottom width of 0.3-0.5 mm and a top width of 0.25-0.45 mm.

9. The display panel according to claim 6, wherein the adsorption spacer is the same as the support spacer in height.

10. The display panel according to claim 1, wherein under a condition that the groove at the top of the adsorption spacer is one in number, the groove has a top width of 0.2-0.4 mm.

11. The display panel according to claim 1, wherein the adsorption spacer adopts highly-elastic resin.

12. The display panel according to claim 11, wherein the highly-elastic resin is polyurethane or ethylene-vinyl acetate copolymer.

13. A manufacturing method of a display panel, comprising:
   forming an adsorption spacer on a first substrate, wherein the adsorption spacer is provided with an adsorption portion;
   cell-assembling the first substrate and a second substrate to form a display panel, wherein the first substrate and the second substrate are cell-assembled together through a vacuum adsorption effect of the adsorption spacer, the adsorption portion comprises a vacuum chamber in a case that the first substrate and the second substrate are cell-assembled together, and the adsorption spacer is configured to support a cell gap; the adsorption spacer is formed at a periphery of the display panel, and no sealant is located at the periphery of the display panel.

14. The manufacturing method of the display panel according to claim 13, wherein the forming of the adsorption spacer on the first substrate comprises: coating a spacer material on the first substrate to form a spacer layer; forming the adsorption spacer through a patterning process, wherein the adsorption spacer is provided with the adsorption portion and the adsorption portion is a groove formed at the top of the adsorption spacer.

15. The manufacturing method of the display panel according to claim 14, wherein the patterning process comprises a multi-gray-scale mask process and the forming of the adsorption spacer through the patterning process comprises: coating a photoresist on the spacer layer; by utilizing a multi-gray-scale mask for fabrication of the adsorption spacer with the groove on the top thereof, exposing and developing the photoresist to form the exposed photoresist, and etching the spacer layer by utilizing the exposed photoresist, so that the adsorption spacer with the groove at the top thereof is formed on the first substrate.

16. The manufacturing method of the display panel according to claim 13, wherein under a condition that material of the spacer material is photoresist, the forming the adsorption spacer comprises: by utilizing a multi-gray-scale mask for fabrication of the adsorption spacer with the groove on the top thereof, exposing and developing the photoresist, so that the adsorption spacer with the groove on the top thereof is formed on the first substrate.

17. The manufacturing method of the display panel according to claim 14, wherein material of the adsorption spacer is highly-elastic resin.

\* \* \* \* \*